(12) United States Patent
Adcock et al.

(10) Patent No.: US 9,193,002 B2
(45) Date of Patent: Nov. 24, 2015

(54) WELDING SYSTEM IMPLEMENTING CONCURRENT AUTO-DAM FABRICATION

(71) Applicant: Caterpillar Inc., Peoria, IL (US)

(72) Inventors: Leon Adcock, Chillicothe, IL (US); Donald Albert Stickel, III, Chillicothe, IL (US); Howard Walter Ludewig, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 13/909,829

(22) Filed: Jun. 4, 2013

(65) Prior Publication Data

US 2014/0353298 A1    Dec. 4, 2014

(51) Int. Cl.
  *B23K 9/12* (2006.01)
  *B23K 9/02* (2006.01)
(52) U.S. Cl.
  CPC .............. *B23K 9/0216* (2013.01); *Y10S 901/42* (2013.01)
(58) Field of Classification Search
  CPC ...... B23K 9/0216; B23K 9/0213; B23K 9/02; Y01S 901/42
  USPC ....... 219/76.12, 125.12, 125.1, 124.1, 137 R, 219/121.45
  See application file for complete search history.

(56) References Cited

U.S. PATENT DOCUMENTS

| | | | | | |
|---|---|---|---|---|---|
| 1,872,306 | A | * | 8/1932 | Larson | 219/137 R |
| 4,302,655 | A | * | 11/1981 | Edling | 219/130.32 |
| 4,590,355 | A | * | 5/1986 | Nomura et al. | 219/125.12 |
| 6,201,216 | B1 | * | 3/2001 | Mumaw | 219/124.34 |
| 7,114,881 | B2 | * | 10/2006 | Belloni et al. | 405/170 |
| 8,809,739 | B2 | * | 8/2014 | Peters et al. | 219/137 PS |

FOREIGN PATENT DOCUMENTS

| | | |
|---|---|---|
| JP | 59-050969 A | 3/1984 |
| JP | 60-106697 A | 6/1985 |
| JP | 06-277843 A | 10/1994 |
| JP | 2003-164968 A | 6/2003 |
| JP | 2007-237220 | 9/2007 |

* cited by examiner

*Primary Examiner* — Mark Paschall
(74) *Attorney, Agent, or Firm* — Finnegan, Henderson, Farabow, Garrett & Dunner, LLP

(57) ABSTRACT

A welding system is disclosed for use in closing a seam. The welding system may have a mount configured to hold a work piece having the seam to be welded, and a robotic welding device movable relative to the mount. The welding system may also have a controller in communication with the robotic welding device and configured to control the robotic welding device to sequentially generate a plurality of weld layers within the seam. Each weld layer may have at least one dam segment extending generally orthogonal to a length direction of the seam, and a main segment extending in the length direction.

25 Claims, 3 Drawing Sheets

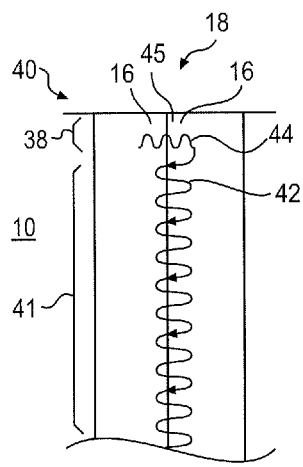 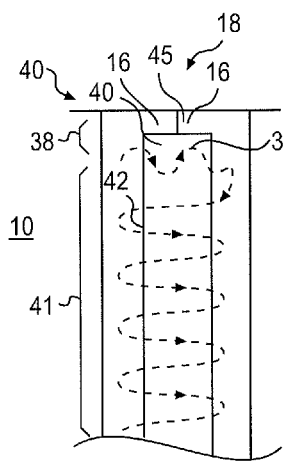 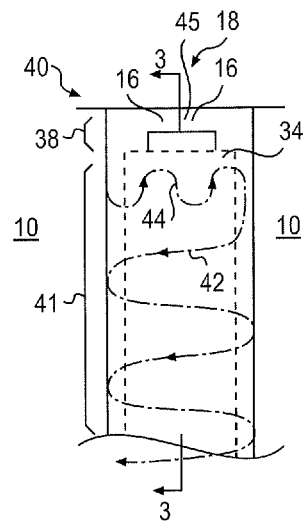
*FIG. 2A*  *FIG. 2B*  *FIG. 2C*
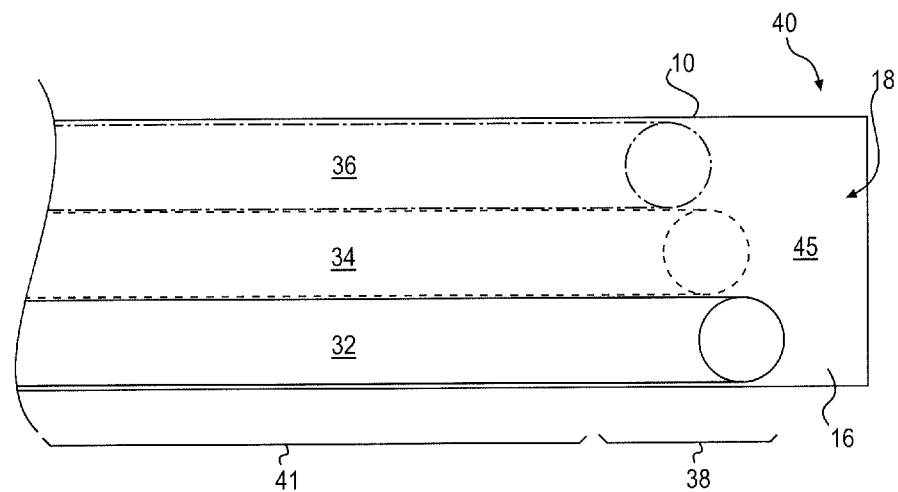
*FIG. 3*

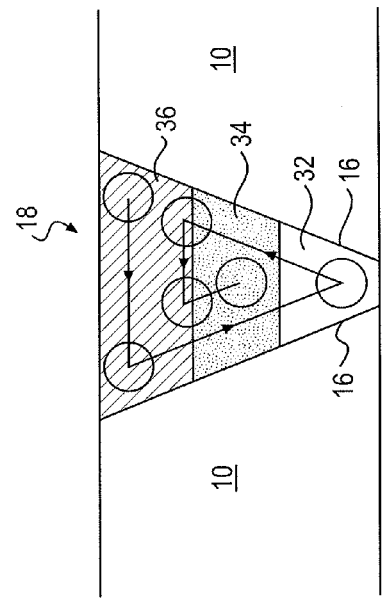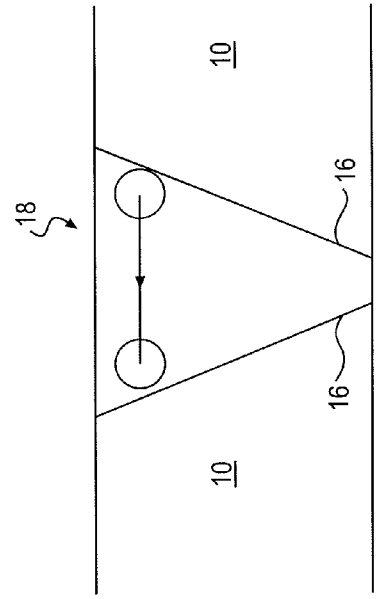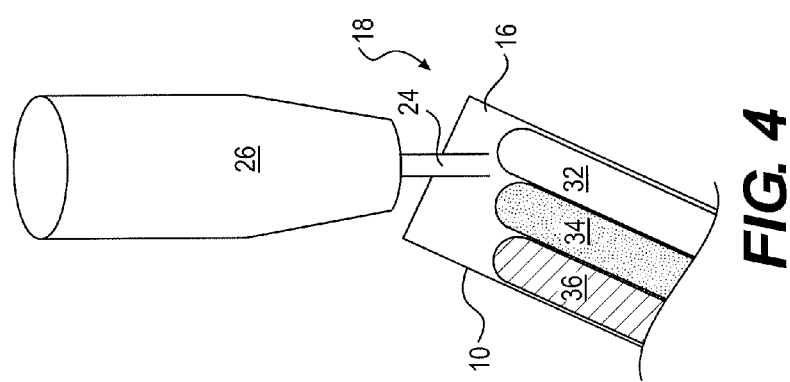

WELDING SYSTEM IMPLEMENTING CONCURRENT AUTO-DAM FABRICATION

TECHNICAL FIELD

The present disclosure relates to a welding system and, more particularly, to a welding system that implements concurrent fabrication of an auto-dam.

BACKGROUND

Welding is a fabrication process used to join two components of similar material to one another through the application of heat and a filler material. Welding can be done manually or autonomously via a welding robot. There are many different ways to weld, but most ways fall into two general categories: wire feed welding and stick welding.

When welding a seam to join two components, wire can be fed to the welding sight or a metal stick can be applied to the welding site and melted to form a pool of molten material. The pool of molten material fills the seam and bonds with melted surfaces of the two components as the material and surfaces cool and harden. Ideally, the seam is completely filled with material during welding, such that an outer surface of the welded seam is generally continuous with corresponding surfaces of the two components. However, because the pool of molten material is fluid during welding, the material can spill out of open ends of the seam. When this happens, the outer surface of the welded seam is not continuous with the corresponding surfaces of the two components. This condition can be aesthetically displeasing and/or result in reduced structural integrity.

Historically, mechanical blocks have been provided at the open ends of the seam to prevent the molten pool from spilling out of the seam. The use of mechanical blocks, however, is a labor-intensive process, as the blocks must first be installed prior to welding and then removed after welding is complete. In addition, the mechanical blocks themselves increase a material cost of the welding process.

One attempt to improve seam welding is disclosed in Japanese Patent No. 2007-237220 of Nobuyoshi et al. (the '220 patent). In particular, the '227 patent describes a welding process wherein a robot welder welds a dam at each open end of a seam. The opposing dams are built to a desired finish height prior to starting the main weld of the seam. In this way, molten material in the seam is blocked by the dams from leaking out of the seam's open ends during welding.

Although the method described in the '227 patent may improve the outer surface quality of a welded seam, it may be less than optimal. Specifically, when welding the dams separate from the main seam weld, the robot welder may have to start and stop welding a greater number of times. And each start and stop during welding has the potential to create inclusions within the weld that reduce a strength of the weld.

The present disclosure is directed to overcoming one or more of the shortcomings set forth above and/or other problems of the prior art.

SUMMARY

In one aspect, the present disclosure is directed to a method of welding a seam. The method may include generating within the seam a first weld layer having a first dam segment oriented generally orthogonal to a length direction of the seam and a first main segment oriented generally parallel with the length direction. The method may also include generating within the seam a second weld layer over the first weld layer. The second weld layer may have a second dam segment oriented generally orthogonal to the length direction of the seam and a second main segment oriented generally parallel with the length direction.

In a second aspect, the present disclosure is directed to a method of welding a seam with a robotic welding device. The method may include causing the robotic welding device to generate within the seam a first layer of continuous welds, and causing the robotic welding device to generate within the seam a second layer of continuous welds over the first layer of continuous welds. Each of the first and second layers of continuous welds may include segments of different orientations generated using different modes of welding.

In a third aspect, the present disclosure is directed to a welding system. The welding system may include a mount configured to hold a work piece having a seam to be welded, and a robotic welding device movable relative to the mount. The welding system may also include a controller in communication with the robotic welding device and configured to control the robotic welding device to sequentially generate a plurality of weld layers within the seam. Each weld layer may have at least one dam segment extending generally orthogonal to a length direction of the seam, and a main segment extending in the length direction.

BRIEF DESCRIPTION OF THE DRAWINGS

FIGS. 2A-2C are diagrammatic illustrations of exemplary disclosed welding steps performed by the welding system of FIG. 1;

FIG. 3 is a cross-sectional illustration of a seam joined by the welding system of FIG. 1;

FIG. 4 is another diagrammatic illustration of the welding system of FIG. 1; and FIGS. 5A and 5B are diagrammatic illustrations of exemplary disclosed finishing steps performed by the welding system of FIG. 1.

DETAILED DESCRIPTION

Figure 1:
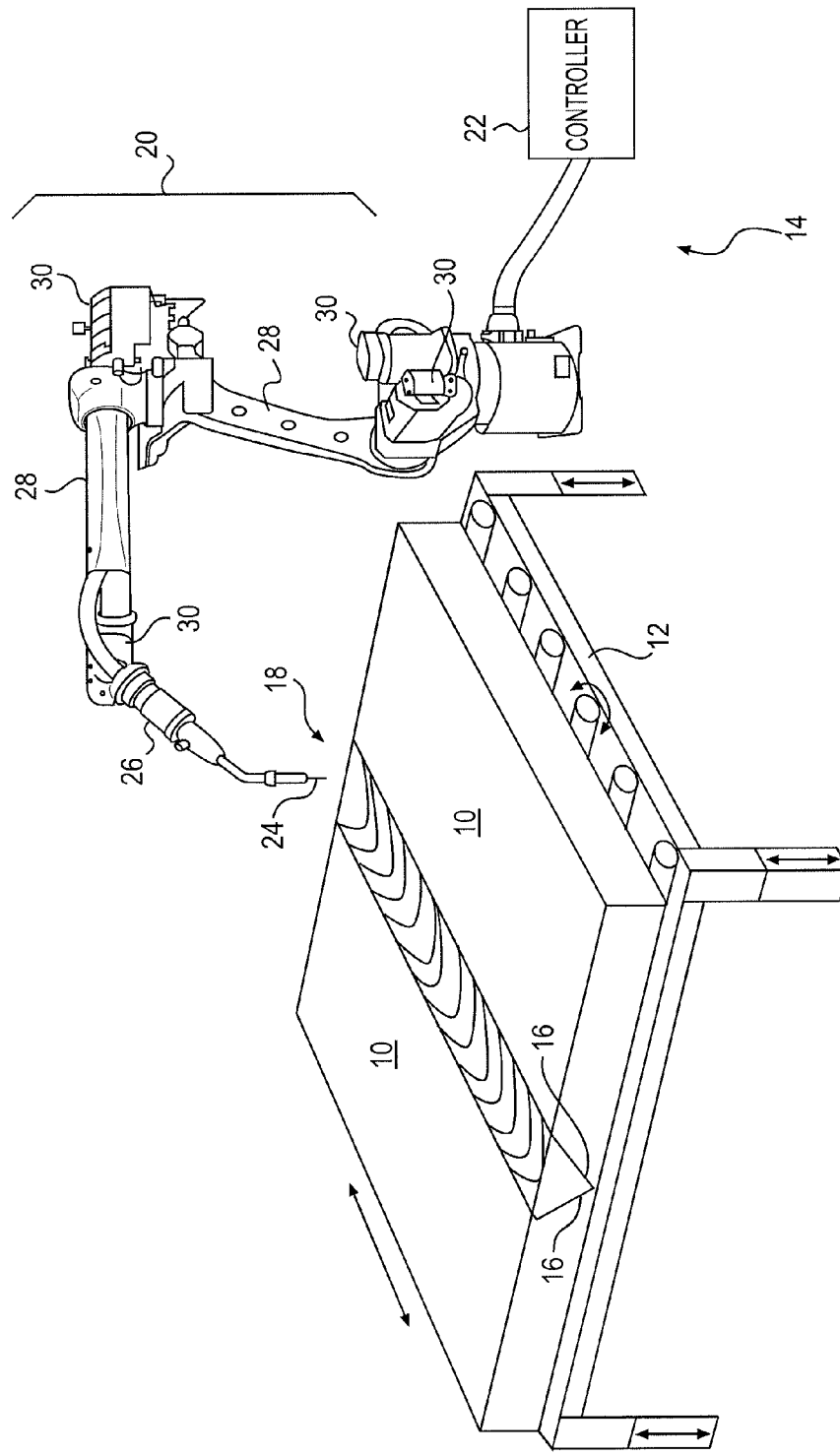
FIG. 1 is a diagrammatic illustration of an exemplary disclosed welding system.

FIG. 1 illustrates two components 10 that are held within a mount 12 during processing by a welding system 14. In the disclosed embodiment, both components 10 are generally planer and held flat against mount 12, with beveled edges 16 of components 10 brought near each other at a seam 18. It is contemplated, however, that components 10 may have any other shape and be oriented differently (e.g., perpendicular to each other), if desired. It is further contemplated that one or more of edges 16 may have another shape, such as a blunt shape, a dual beveled edge, etc., and/or that the adjacent edges 16 of seam 18 may be integral to the same component 10.

Mount 12 may be configured to hold components 10 generally stationary relative to each other, and either hold components 10 stationary or move components 10 relative to welding system 14 during a welding operation. For example, mount 12 may be equipped with one or more actuators (not shown) that are configured to linearly move components 10 in a length wise direction of seam 18, move components 10 in a transverse direction, and/or tilt components 10 toward and/or away from welding system 14.

Welding system 14 may include components that cooperate to autonomously fill seam 18 with weld material, thereby joining components 10 to each other (or joining edges 16 of a single component 10 to each other). For example, welding system 14 may include, among other things, a robotic welding device (rwd) 20 and a controller 22 configured to regulate movements of rwd 20. Rwd 20 may take any form known in the art, for example a device having a head 26, one or more arms 28 operatively connected to head 26, and a plurality of motors or actuators 30 configured to move arms 28 and/or head 26 during a welding process in response to commands from controller 22. Head 26 may be configured feed or otherwise advance a metal rod or wire 24 toward seam 18 while simultaneously directing current through rod 24. In some embodiments, rwd 20 may also be used to detect, identify, locate, and/or measure aspects of components 10 during processing, as is known in the art.

Controller 22 may control operations of welding system 14 in response to sensory input (i.e., the detection, identification, location, and/or measurement input from rwd 20) and/or one or more sets of instructions contained within memory. Specifically, in response to signals received from rwd 20, controller 22 may adjust power sent to and/or operation of head 26 and actuators 30. It is contemplated that controller 22 may also communicate with the actuators of mount 12 and be configured to selectively move components 10 relative to head 26 based on input from rwd 20 and/or the instructions stored in memory, if desired.

Controller 22 may embody a single microprocessor or multiple microprocessors that include a means for controlling an operation of welding system 14. Numerous commercially available microprocessors may perform the functions of controller 22. Controller 22 may include or be associated with a memory for storing data such as, for example, an operating condition, design limits, performance characteristics or specifications of welding system 14 and components 10, and/or operational instructions. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of welding system 14 via either wired or wireless transmission and, as such, controller 22 may be disposed in a location remote from welding system 14, if desired.

Controller 22 may be configured to adjust welding modes of operation during a single welding event (e.g., during welding of a single continuous layer of welds within seam 18). For example, controller 22 may be capable of causing head 26 to weld in a first mode of operation and in a second mode of operation. The first mode of operation may include a pulsed mode of operation wherein a relatively lower amperage current is directed through rod 24 of head 26 in pulses. Such operation generally produces a smaller puddle of molten material having a lower temperature that cools quickly. Accordingly, the weld segment generated by head 26 during operation in the pulsed mode may be highly controllable. The second mode of operation may include a constant current mode of operation wherein a relatively higher amperage current is continuously directed through rod 24 of head 26. Such operation generally produces a larger puddle of molten material having a higher temperature that takes longer to cool. The weld segment generated by head 26 during operation in the constant current mode may fill a larger void in seam 18 and have greater penetration into components 10, but also be more difficult to control.

Controller 22 may be configured to cause head 26 to fill seam 18 with weld material according to one or more algorithms stored in memory. Different steps of these algorithms are visually depicted in FIGS. 2A-2C, 3, 4, 5A, and 5B. These figures will be discussed in more detail in the following section to further illustrate the disclosed concepts.

INDUSTRIAL APPLICABILITY

The disclosed welding system may be used to produce a high quality weld seam having an outer surface substantially co-planar with outer surfaces of the component(s) being welded. In particular, the disclosed welding system may be capable of reducing the amount of molten material that leaks out of a seam's open ends during welding, while also reducing the amount of inclusions in the resulting welds. Operation of welding system 14 will now be described in detail.

Operation of welding system 14 can generally be divided into three different phases, including a perception phase, a calculation phase, and a weld phase. During the perception phase, controller 22 may, via head 26, gather information regarding components 10 to be welded. This information may include detection of components 10, identification of components 10, the location and/or orientation of components 10, and/or measurements of different characteristics of components 10 (e.g., length, width, and/or height of seam 18). This information may be gathered in any manner known in the art, for example by causing rwd 20 to move in particular directions by known amounts until rod 24 of a known extension from head 26 engages particular features of components 10. It is contemplated that additional sensors, cameras, and/or manual input may also be used to gather the information described above, if desired.

Based on the detected information, controller 22 may then determine the number of welds to be generated, the sizes and/or configurations of the welds, and/or parameters of rwd 20 that should be utilized during a generation of the welds. For example, based on an identification of components 10, a material type of components 10 (determined, e.g., through reference of the identification with a map stored in memory), a location and/or orientation of components 10, a location of seam 18 within components 10, a length of seam 18, a width of seam 18, and/or a bevel configuration (e.g., existence of bevel and/or angle of bevel) at edges 16, controller 22 may determine a number of weld layers that should be created to adequately fill seam 18 and a number and configuration of weld segments within each layer.

After determining the number, sizes, and configurations of welds to be generated, controller 22 may then follow one or more different algorithms stored in memory to fill seam 18 with weld material. In the disclosed embodiment shown in FIGS. 2A-5B, based on the detected information, controller 22 has determined the need to generate three different weld layers These weld layers include a first or base layer 32, at least one intermediate layer 34, and an outer or final layer 36. It is contemplated that any number of intermediate layers 34 may be utilized and/or that intermediate layer 34 may be omitted, if desired. Controller 22 may also determine the need to create a dam 38 at an open end 40 of seam 18 that inhibits molten material of a main weld 41 from leaking out open end 40 during the weld process. Each of weld layers 32-36 may form a portion of dam 38 and main weld 41, as will be described below.

Each of weld layers 32-36 may consist of a main segment 42 and one or more dam segments 44 (e.g., one at each end of main segment 42, near open end(s) 40). Main segment 42 may generally extend in a lengthwise direction of seam 18, while dam segment(s) 44 may be oriented generally perpendicular to the lengthwise direction. Each of main and dam segments 42, 44 may be generated using any weave pattern known in the art, for example a sinusoidal weave pattern. In the disclosed embodiment, main and dam segments 42, 44 are generated continuously, for example by generating a first dam segment 44, generating the main segment 42, then generating the remaining dam segment 44 at an opposing end of main segment 42. When a single dam segment 44 is utilized within a particular weld layer, that dam segment 44 may be generated before generation of the associated main segment 42.

Controller 22 may cause rwd 20 to generate main and dam segments 42, 44 using different modes of operation. Specifically, main segment 42 may be generated using the constant current mode of operation, while dam segment 44 may be generated using the pulsed mode of operation. In this manner, dam segments 44 may be tightly controlled to inhibit flow of molten material associated with dam segments 44 from leaking out open end 40 of seam 18, while main segment 42 may result in faster generation, greater material deposition, and deeper bonding penetration.

It is contemplated that, even with the greater control of dam segment generation using the pulsed mode of operation, dam segments 44 may be generated a distance inward of the open end 40 of seam 18, to help ensure that no material leaks completely out of open end 40. In some instances, this may leave a void 45 (shown only in FIGS. 2A, 2B, 2C, and 3) at the end of seam 18, which can be filled using an additional process that will be described in more detail below. Alternatively, dam segments 44 could be formed generally flus with the end walls of components 10 at seam 18 and/or intentionally caused to extend past the end of seam 18. When dam segments 44 extend past the end of seam 18, the associated protruding material may be ground away in a later manual or automated process, as desired.

After generation of a complete weld layer, for example base layer 32, controller 22 may commence generation of an adjacent layer, for example intermediate layer 34. Generation of each layer may be accomplished in a substantially identical manner, with one dam segment 44 being generated, then main segment 42 being generated, and then a final dam segment 44 being generated (assuming a final dam segment 44 is required). However, the placement of dam segments 44 may be different between layers. For example, dam segment 44 of base layer 32 may be located closer to open end 40 than dam segment 44 of intermediate layer 34. In this manner, dam segments 44 may lean inward to main segment 42. This inward leaning may result in low surface tension in the molten puddle of main segment 42 during formation thereof, thereby helping to bond main segment 42 to dam segment 44. In the disclosed embodiment, dam segments 44 may lean inward at an interior angle of about 70°. It is contemplated that dam segments 44 may alternatively lean inward at a different angle, be vertically oriented, and/or lean outward, if desired.

It is contemplated that the generation of each weld layer may begin at the same end of seam 18 or at alternating ends, depending on the identification of components 10 and their intended applications. For example, formation of base layer 32 may start at a first end of seam 18 with the generation of dam segment 44, generation of main segment 42, and then generation of another dam segment 44 at an opposing second end of seam 18. Formation of intermediate layer 34 may then be initiated with generation of its first dam segment 44 at either the first end or the second end of seam 18. In applications where time and/or efficiency in the welding process is essential, generation of the first dam segment 44 of intermediate layer 34 at the second end of seam 18 may be most beneficial. However, in applications where distortion of components 10 due to heat buildup is an issue, starting weld layer generation at the same end of seam 18 may allow for some heat to dissipate from particular areas of components 10 before those areas are reheated during generation of the next weld layer.

As shown in FIGS. 2A-2C, each subsequent weld layer may generally be wider and shorter than the previously generated weld layer. For example, base layer 32 may be the longest and narrowest weld layer, while outer layer 36 may be the widest and shortest weld layer. The width of weld layers 32-36 may be a function of the bevel angle at edges 16, while the length may be a function of the lean angle of dam segments 44.

Void 45 may be filled in using a finishing process implemented by controller 22. As shown in FIG. 4, the finishing process may begin after creation of all weld layers 32-36 of a particular weld operation. The finishing process may begin with the tilting of components 10 relative to head 26 of rwd 20. This tilting may be accomplished by tilting mount 12 upon which components 10 rest and/or by moving head 26. In general, components 10 may be tilted relative to head 26 until end surfaces of dam segments 44 of weld layers 32-36 form a generally horizontal floor. In the disclosed embodiment, this may be achieved by tilting components 10 by the same angle at which dam segments 44 lean inward toward main segments 42 (e.g., by about 70°). Controller 22 may regulate rwd 20 to deposit one or more layers of additional weld material on top of the end surfaces of dam segments 44 co-located at the same end of seam 18.

In the disclosed embodiment, controller 22 is configured to cause rwd 20 to deposit a first finishing layer of material directly on top of the end surfaces of dam segments 44 (shown in 5A), and a second finishing layer on top of the first finishing layer at dam segment 44 of outer layer 36 (shown in FIG. 5B). The first finishing layer may be generated by depositing weld material in a generally spiraling manner, starting from a first end of dam segment 44 of outer layer 36, moving linearly to a second end of the dam segment 44, moving at an angle inward toward a bevel tip of seam 18 at base layer 32, moving outward at an angle toward an intersection of intermediate and outer layers 34, 36 at the first end, moving linearly to the second end of dam segment 44 at the intersection, then moving toward a general center of intermediate layer 34. The second finishing layer may be generated by depositing weld material in a generally linear manner across only dam segment 44 of outer layer 36. It is contemplated, however, that other methods may alternatively be utilized to fabrication the finishing layer at the open end 40 of seam 18, if desired.

The disclosed welding system may produce high quality welded seams in a time efficient manner. Specifically, because the disclosed system may utilize welded dams at open ends of a seam to be welded, the resulting weld may have a more aesthetically pleasing outer surface with enhanced strength. In addition, because the disclosed system may generate the welded seam with few stops and starts in the welding process, the likelihood of inclusions being generated may be low. Further, because the different segments of the welded seam (e.g., the dam segments and the main segments) may be generated in a continuous manner, the process may require little time to complete.

It will be apparent to those skilled in the art that various modifications and variations can be made to the disclosed welding system. Other embodiments will be apparent to those skilled in the art from consideration of the specification and practice of the disclosed welding system. It is intended that the specification and examples be considered as exemplary only, with a true scope being indicated by the following claims and their equivalents.

What is claimed is:

1. A method of welding a seam, comprising:
generating within the seam a first weld layer having a first dam segment oriented generally orthogonal to a length direction of the seam and a first main segment oriented generally parallel with the length direction; and generating within the seam a second weld layer over the first weld layer, the second weld layer having a second dam segment oriented generally orthogonal to the length direction of the seam and a second main segment oriented generally parallel with the length direction.

2. The method of claim 1, wherein:
generating the first weld layer includes generating the first dam segment before generating the first main segment; and
generating the second weld layer includes generating the second dam segment before generating the second main segment.

3. The method of claim 2, wherein:
generating the first weld layer includes continuously generating the first dam segment and the first main segment; and
generating the second weld layer includes continuously generating the second dam segment and the second main segment.

4. The method of claim 3, wherein:
generating the first weld layer includes generating the first dam segment, the first main segment, and a third dam segment at an opposing end of the first main segment relative to the first dam segment; and
generating the second weld layer includes generating the second dam segment, the second main segment, and a fourth dam segment at an opposing end of the second main segment relative to the second dam segment.

5. The method of claim 4, wherein:
the first and second dam segments are located at a first end of the seam;
the third and fourth dam segments are located at an opposing second end of the seam; and
generating the second weld seam includes generating the second dam segment immediately following generation of the third dam segment and before generation of a remainder of the second weld layer.

6. The method of claim 4, wherein:
the first and second dam segments are located at a first end of the seam;
the third and fourth dam segments are located at an opposing second end of the seam; and
generating the second weld seam includes generating the fourth dam segment immediately following generation of the third dam segment and before generation of a remainder of the second weld layer.

7. The method of claim 1, wherein:
generating the first and second dam segments includes generating the first and second dam segments via pulsed applications of lower current; and
generating the main segments of the first and second layers includes generating the main segments of the first and second layers via continuous applications of higher current.

8. The method of claim 1, wherein the first dam segment is located closer to an adjacent open end of the seam than the second dam segment.

9. The method of claim 2, wherein generating the first and second dam segments includes generating the first and second dam segments at locations short of an end of the seam.

10. The method of claim 9, further including filling in the end of the seam after the first and second weld layers have been generated.

11. The method of claim 10, wherein filling in the end of the seam includes:
tilting the seam relative to a welding head such that the first and second dam segments form a floor; and
generating a finish weld on the floor.

12. The method of claim 11, wherein generating the finish weld includes:
generating a first finish weld in an inward spiraling direction over the first and second dam segments; and
generating a second finish weld over the first finish weld at the first dam segment.

13. The method of claim 2, wherein generating the first and second dam segments includes generating the first and second dam segments flush with an end of the seam.

14. The method of claim 2, wherein:
generating the first and second dam segments includes generating the first and second dam segments to extend past an end of the seam; and
the method further includes grinding away an amount of the first and second dam segments that extends past the end of the seam.

15. The method of claim 1, wherein:
generating the first and second weld layers includes laying down molten material in the seam in a general sinusoidal weave pattern.

16. The method of claim 1, wherein the second weld layer is wider and shorter than the first weld layer.

17. The method of claim 1, further including;
detecting a characteristic of the seam; and
setting a weld parameter of the first and second weld layers based on the characteristic.

18. The method of claim 17, wherein detecting the characteristic includes detecting at least one of an identity of a component in which the seam is formed, and a geometry of the seam.

19. A method of welding a seam with a robotic welding device, comprising:
causing the robotic welding device to generate within the seam a first layer of continuous welds; and
causing the robotic welding device to generate within the seam a second layer of continuous welds over the first layer of continuous welds,
wherein each of the first and second layers of continuous welds includes segments of different orientations generated using different modes of welding.

20. The method of claim 19, wherein the segments include:
a main segment aligned with a length direction of the seam and generated through continuous application of higher current; and
at least one dam segment oriented generally perpendicular to the main segment and generated through pulsed application of lower current.

21. The method of claim 20, wherein causing the robotic welding device to generate the first and second layers of continuous welds includes causing the robotic welding device to generate the at least one dam segment and then causing the robotic welding device to generate the main segment.

22. A welding system, comprising:
a mount configured to hold a work piece having a seam to be welded;
a robotic welding device movable relative to the mount; and
a controller in communication with the robotic welding device and configured to control the robotic welding device to sequentially generate a plurality of weld layers within the seam, each weld layer having:

at least one dam segment extending generally orthogonal to a length direction of the seam; and
a main segment extending in the length direction.

23. The welding system of claim 22, wherein the controller is further configured to generate the at least one dam segment before the main segment within each of the plurality of weld layers.

24. The welding system of claim 23, wherein the controller is further configured to generate the at least one dam segment and the main segment continuously.

25. The welding system of claim 22, wherein:
the at least one dam segment is generated through pulsed application of lower current; and
the main segment is generated through continuous applications of higher current.

* * * * *